United States Patent
Lee et al.

(10) Patent No.: US 9,153,019 B2
(45) Date of Patent: Oct. 6, 2015

(54) ELECTRONIC DEVICE AND METHOD FOR DETECTING STATE OF LAMPS

(71) Applicant: ShenZhen Goldsun Network Intelligence Technology Co., Ltd., ShenZhen (CN)

(72) Inventors: Hou-Hsien Lee, New Taipei (TW);
Chang-Jung Lee, New Taipei (TW);
Chih-Ping Lo, New Taipei (TW)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 214 days.

(21) Appl. No.: 13/965,181

(22) Filed: Aug. 12, 2013

(65) Prior Publication Data
US 2014/0056506 A1    Feb. 27, 2014

(30) Foreign Application Priority Data
Aug. 27, 2012 (TW) .............................. 101130960 A

(51) Int. Cl.
G06K 9/00 (2006.01)
G06T 7/00 (2006.01)

(52) U.S. Cl.
CPC .................. G06T 7/0004 (2013.01)

(58) Field of Classification Search
CPC combination set(s) only.
See application file for complete search history.

(56) References Cited

U.S. PATENT DOCUMENTS

| | | | |
|---|---|---|---|
| 6,281,808 B1* | 8/2001 | Glier et al. .................... | 340/933 |
| 7,580,173 B2* | 8/2009 | Yoon ............................. | 359/263 |
| 8,620,032 B2* | 12/2013 | Zeng ............................. | 382/104 |
| 2002/0177982 A1* | 11/2002 | Boulouednine et al. ......... | 703/1 |
| 2007/0236411 A1* | 10/2007 | Kurosaki et al. ................ | 345/30 |
| 2009/0060270 A1* | 3/2009 | Lee et al. ....................... | 382/103 |
| 2010/0074506 A1* | 3/2010 | Yamada ......................... | 382/133 |
| 2010/0295925 A1* | 11/2010 | Maier ............................. | 348/47 |
| 2012/0139425 A1* | 6/2012 | Kim ............................... | 315/152 |
| 2012/0194102 A1* | 8/2012 | King ............................. | 315/362 |
| 2014/0009617 A1* | 1/2014 | Utagawa et al. ............. | 348/148 |
| 2015/0035437 A1* | 2/2015 | Panopoulos et al. .......... | 315/112 |

* cited by examiner

*Primary Examiner* — Anand Bhatnagar
(74) *Attorney, Agent, or Firm* — Novak Druce Connolly Bove + Quigg LLP

(57) ABSTRACT

In a method for closely monitoring a state of a lamp using an electronic device, a plurality of images of the lamp are captured by an image capturing unit of the lamp and a specified number of captured images are sampled. A luminance value of each of the sampled images is calculated to determine a state of the lamp, the possible states of the lamp including a normal state and an abnormal state. The lamp is marked or indicated accordingly on a monitoring interface when the lamp is in the abnormal state.

18 Claims, 10 Drawing Sheets

ELECTRONIC DEVICE AND METHOD FOR DETECTING STATE OF LAMPS

BACKGROUND

1. Technical Field

Embodiments of the present disclosure relate to monitoring technology, and particularly to an electronic device and a method for detecting state of lamps.

2. Description of Related Art

Usually, the state of lamps is detected manually. A service man must walks to lamps to inspect states (e.g., whether they are functional or not) of the lamps, however, it is hard to find damaged lamps as soon as they are damaged. Therefore, a prompt and efficient method for detecting state of lamps is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
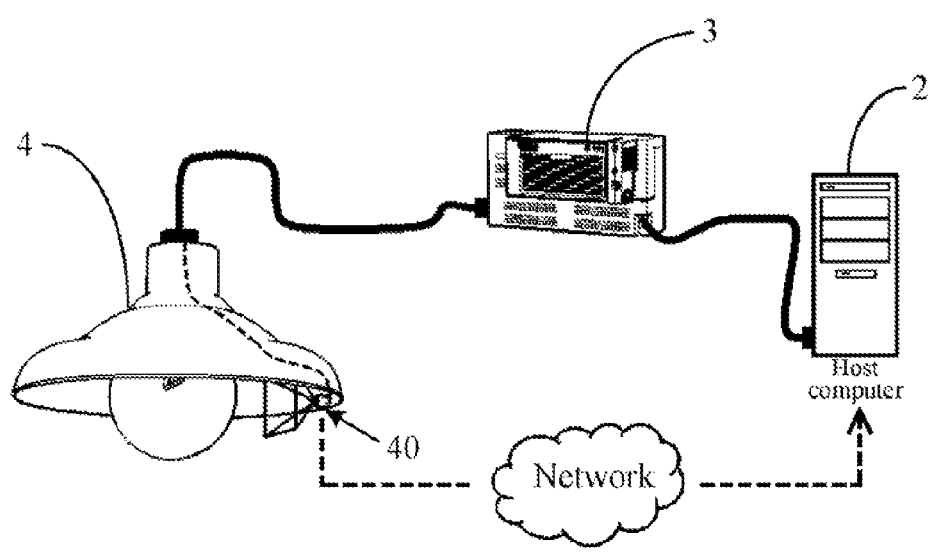
FIG. 1 is a schematic diagram of one embodiment of a host computer connecting with a plurality of lamps.

FIG. 1 is a schematic diagram of one embodiment of a host computer 2 connecting with a plurality of lamps 4 (one lamp is shown as example). In one embodiment, the host computer 2 is connected with the lamps 4 through a power control equipment 3. The power control equipment 3 controls the lamps 4 to power on or power off. For example, the power control equipment 3 may be a programmable logic controller (PLC) or a programmable automation controller (PAC), which is used to record a switch condition (e.g., a power-on condition or a power-off condition) of each lamp 4. The host computer 2 can obtain the switch condition of each lamp 4 through the power control equipment 3.

Figure 2:
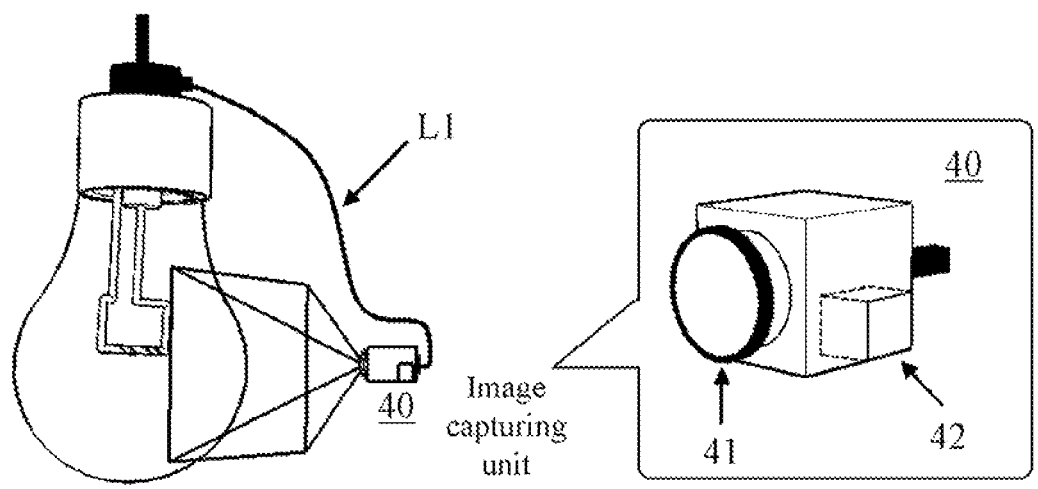
FIG. 2 is a schematic diagram of the lamp equipped with an image capturing unit.

For example, as shown in FIG. 2, the lamp 4 is a light-emitting device using an electric bulb. In other embodiments, the lamp 4 may be other light-emitting device, such as light emitting diode (LED) street lamps. The lamp 4 is equipped with an image capturing unit 40, the image capturing unit 40 and the lamp may share a power line "L1". In one embodiment, a diffusion filter (e.g., a diffusion foil) 41 is installed in front of a lens of the image capturing unit 40. The image capturing unit 40 further includes a network module 42 (hereinafter referred to as "a first network module 42"). The first network module 42 may be a wireless network module, such as a WIFI module.

In one embodiment, the diffusion filter 41 is used in front of the lens of the image capturing unit 40 to soften the image of the scene being shot. The diffusion filter 41 spreads the light from a flash of the image capturing unit 40. In effect, the light of the lamp 4 will not come from one concentrated source (like a spotlight), but rather will spread out, bounce from reflective ceilings and walls, thus getting rid of harsh light, and hard shadows.

The image capturing unit 40 captures images of the lamp 4, when the lamp 4 is powered on, after a preset time interval (e.g., ten minutes), and transmits the captured images to the host computer 2 through the first network module 42.

Figure 3:
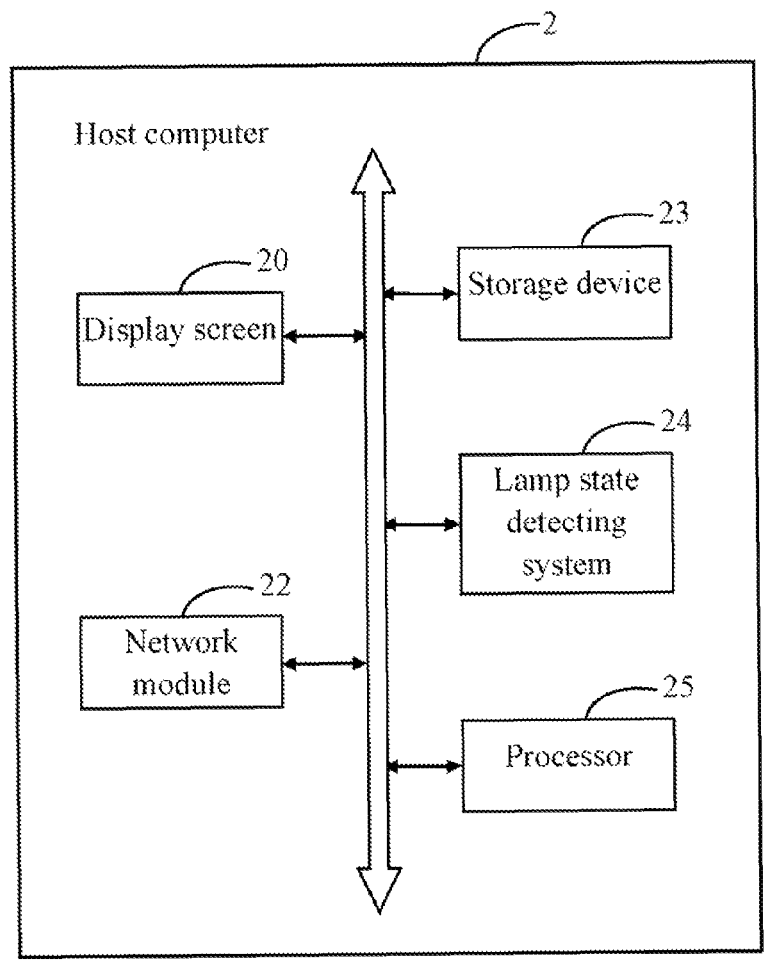
FIG. 3 is a schematic diagram of one embodiment of the host computer including a lamp state detecting system.

FIG. 3 is a block diagram of one embodiment of the host computer 2 including a lamp state detecting system 24. The host computer 2 further includes a display screen 20, a network module 22 (hereinafter referred to as "a second network module 22"), a storage device 23, and at least one processor 25. FIG. 1 illustrates only one example of the host computer 2 that may include more or fewer components than illustrated, or have a different configuration of the various components in other embodiments. The host computer 2 may be other suitable electronic device, such as a smart phone, and the display screen 20 may be a liquid crystal display (LCD) screen. The storage device 23 may be a smart media card, a secure digital card, a compact flash card, or any other memory storage device.

The lamp state detecting system 24 detects whether the lamp 4 is in a normal state or an abnormal state by analyzing the images of the lamp 4 captured by the image capturing unit 40, and sends alarm messages (warning messages) to a preset user when the lamp 4 is in abnormal state. A detailed description is given in the following paragraphs. In one embodiment, the lamp state detecting system 24 includes computerized instructions in the form of one or more programs that are executed by the processor 25 and stored in the storage device 23 (or memory).

Figure 4:
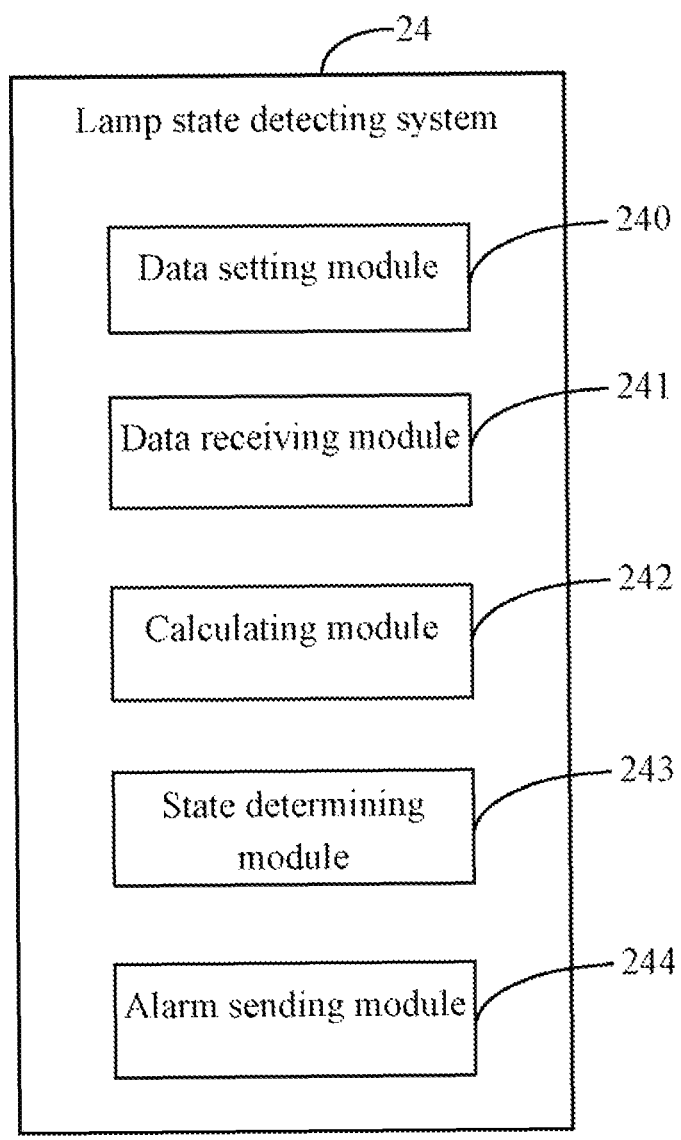
FIG. 4 is a schematic diagram of function modules of the lamp state detecting system included in the host computer.

FIG. 4 is a block diagram of function modules of the lamp state detecting system 24 included in the host computer 2. In one embodiment, the lamp state detecting system 24 may include one or more modules, for example, a data setting module 240, a data receiving module 241, a calculating module 242, a state determining module 243, and an alarm sending module 244. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 5:
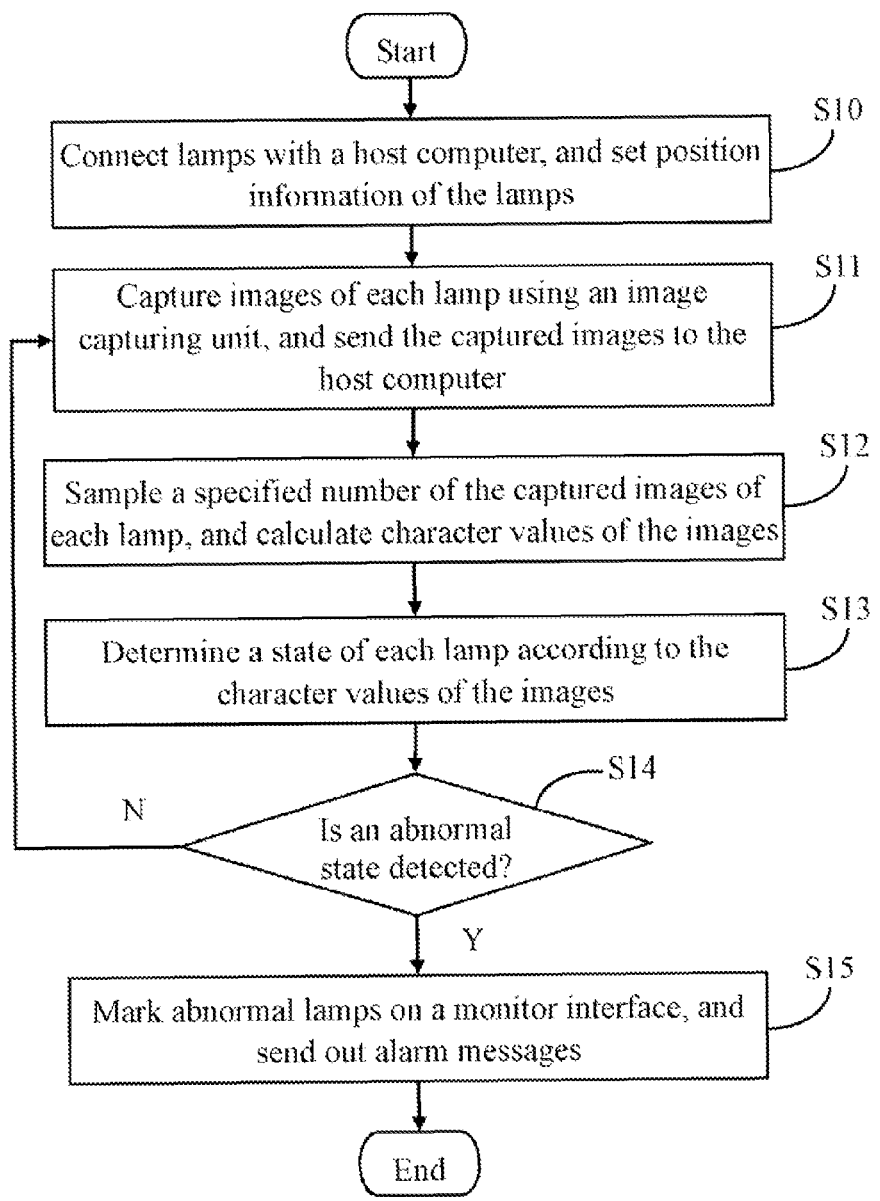
FIG. 5 is a flowchart of one embodiment of a method for detecting state of lamps.

FIG. 5 is a flowchart of one embodiment of a method for detecting state of lamps. Depending on the embodiment, additional steps may be added, others removed, and the ordering of the steps may be changed.

Figure 6:
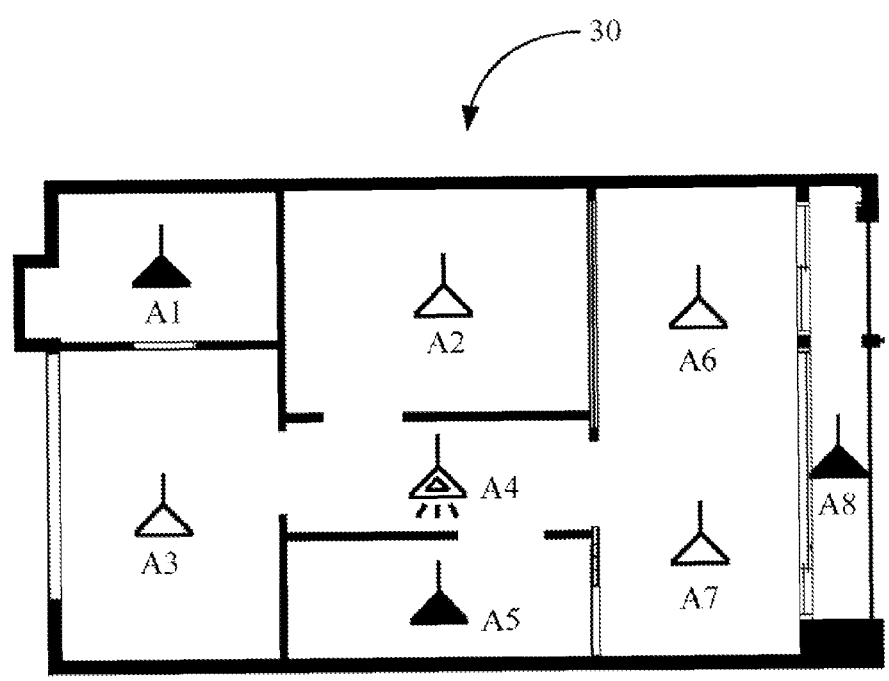
FIG. 6 is a schematic diagram of a monitor interface including a plurality of lamp icons.

In step S10, the power control equipment 3 is connected to the lamps 4 in a specified scene being monitored, and further connected to the host computer 2. Then, a positional information of each lamp 4 is set on a monitor interface 30 through the data setting module 240, and the positional information of each lamp 4 is stored in the storage device 23. As shown in FIG. 6, the specified monitoring scene includes eight lamps "A1-A8". A user may double-click an icon of a lamp on the monitor interface 30 to set the positional information of the lamp.

In step S11, when one of the lamps 4 is powered on, the image capturing unit 40 captures images of the lamp 4 at a certain time interval (e.g., one second), and sends the captured images to the host computer 2 through the first network module 42. At the same time, the positional information of the lamp 4 is sent to the host computer 2 with the captured images.

In step S12, the data receiving module 241 receives the captured images through the second network module 22. Then, the calculating module 242 samples a specified number (e.g., ten) of the captured images of each lamp 4, and calculates a character value for each of the sampled images. The character value may be a luminance value of each sampled image. The luminance value of each sampled image is obtained by calculating an average value of the luminance values of all the pixels in each sampled image.

For example, the calculating module 242 transforms a sampled image into a binary image using an image processing method, calculates an average value of the luminance values of all the pixels in the binary image, and determines the calculated average value as the character value of the sampled image. For another example, the sampled image is not transformed into a binary image, the calculating module 242 calculates the average value of the luminance values of the pixels in the sampled image directly, to obtain the character value of the sampled image. Calculation time is reduced when the sampled image is transformed into a binary image.

In step S13, the state determining module 243 determines a state of each lamp 4 according to the character values of the sampled images of each lamp 4. In one embodiment, the state of each lamp 4 includes a normal state and an abnormal state. The normal state indicates that the lamp 4 works normally, and the abnormal state indicates that the lamp 4 works abnormally or is not working.

Figure 7:
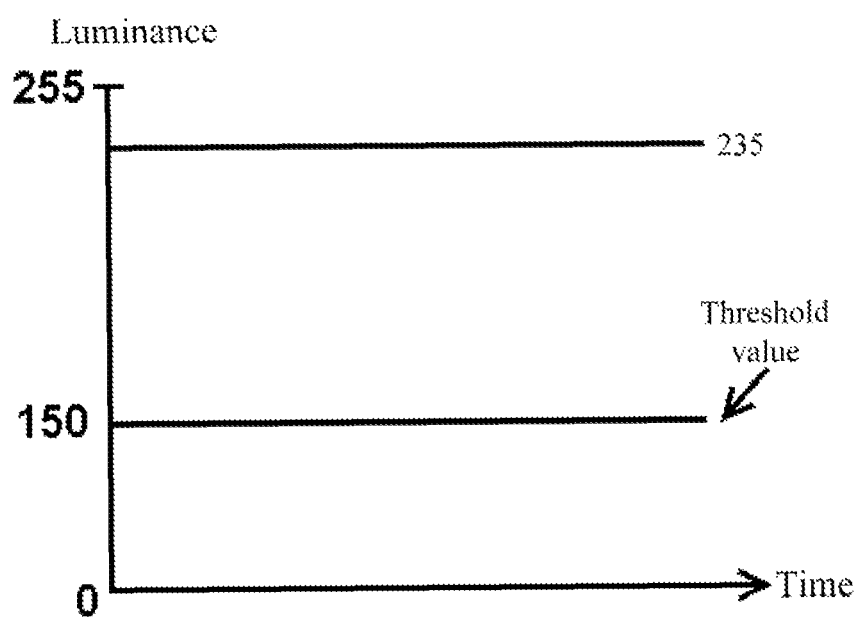
FIGS. 7-10 are curve diagrams of luminance values of captured images of the lamps.
Figure 8:
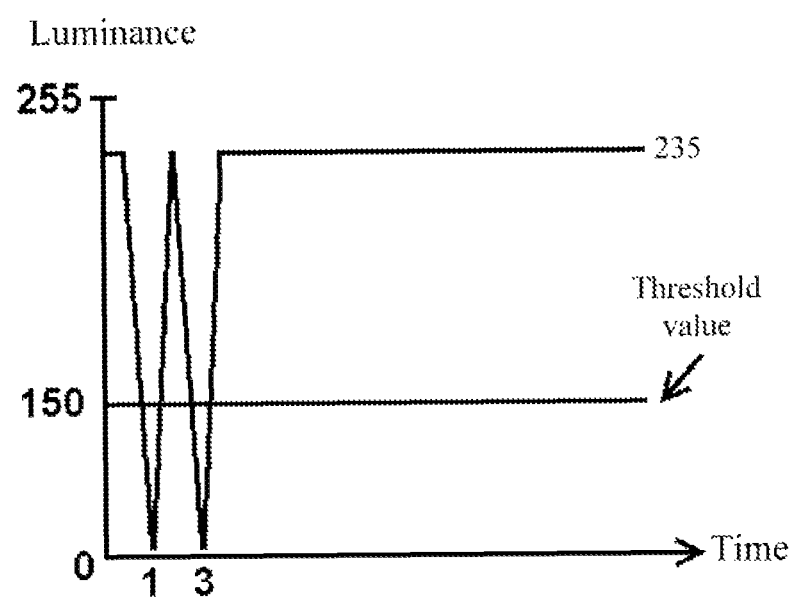

Under the power-on condition of the lamp 4, if the character value of each sampled image is greater than a threshold value (as shown in FIG. 7), or the character values of previous sampled images captured within a previous preset time period are less than the threshold value, and the character values of subsequent sampled images captured within a subsequent preset time period are greater than the threshold value (as shown in FIG. 8), the state determining module 243 determines that the lamp 4 is in the normal state. In one embodiment, the threshold value is 150, and the preset time period is three seconds. This mean that the lamp 4 may be dimmed/show more black within a 3-sec period, but then get brighter/whiter, it is determined as the normal state.

Figure 9:
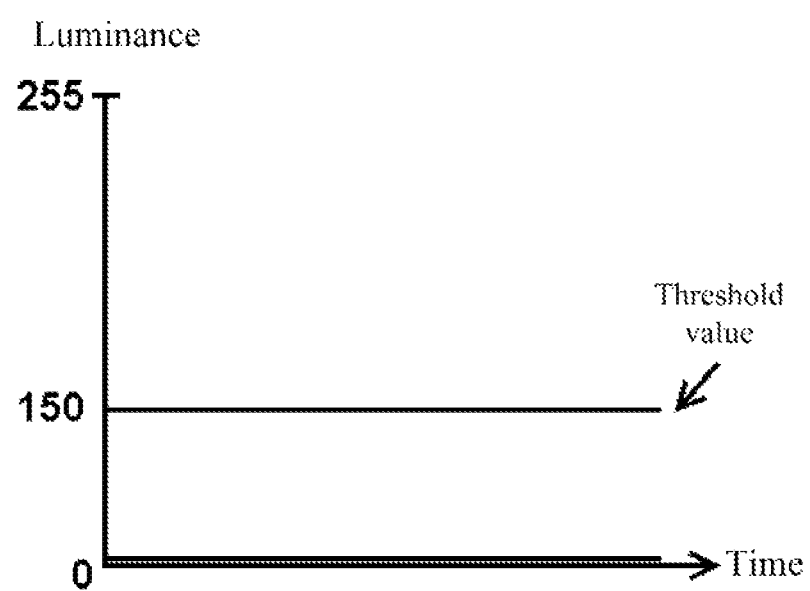
Figure 10:
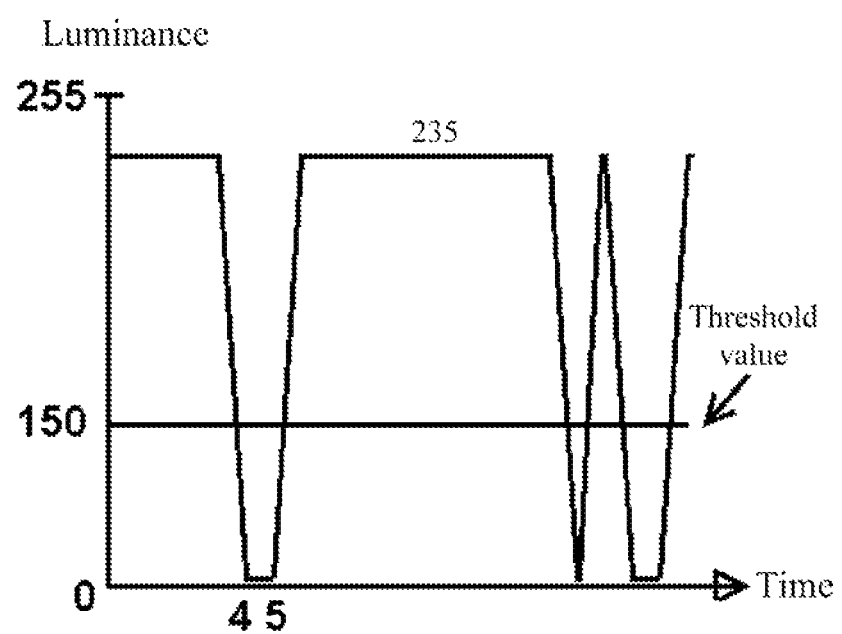

Under the power-on condition of the lamp 4, if the character value of each sampled image is less than the threshold value (as shown in FIG. 9), or the character values of some sampled images are greater than the threshold value at a first time, and the character values of some sampled images are less than the threshold value at a second time (alternating between being greater than and being less than the threshold value, as shown in FIG. 10), the state determining module 243 determines that the lamp 4 is in the abnormal state.

For example, as shown in FIG. 7, the luminance values of all the sampled images are greater than the threshold value, thus the state determining module 243 determines that the lamp 4 is in the normal state. As shown in FIG. 8, the luminance values of previous sampled images are less than the threshold value, but the luminance values of subsequent sampled images after time point three are greater than the threshold value, thus, the state determining module 243 determines that the lamp 4 is in the normal state.

For example, as shown in FIG. 9, the luminance values of all the sampled images are less than the threshold value, thus the state determining module 243 determines that the lamp 4 is in the abnormal state. As shown in FIG. 10, the luminance values of some sampled images are greater than the threshold value at a first time, and the luminance values of other sampled images are less than the threshold value at a second time, thus the state determining module 243 determines that the lamp 4 is in the abnormal state.

In step S14, the state determining module 243 determines whether one of the lamps 4 is in the abnormal state. If one of the lamps 4 is in the abnormal state, the procedure goes to step S15. If all of the lamps 4 are in the normal state, the procedure returns to step S11.

In step S15, the alarm sending module 244 marks abnormal lamps on the monitor interface 30 (e.g., highlights icons of the abnormal lamps) according to the positional information of the abnormal lamps, and sends alarm messages (warning messages) to the preset user using short message service (SMS) or Multimedia Messaging Service (MMS) messages, such as voice messages. In one embodiment, different colors are set for the icons of the lamps 4 to indicate different states of the lamps 4. For example, a gray color indicates that one lamp 4 is powered off, a green color indicates that one lamp 4 is powered on and is working normally, and a red color indicates that one lamp is powered on but is working abnormally.

For example, as shown in FIG. 6, if the lamps A1, A5, and A8 are powered off, and the lamps A2, A3, A6, and A7 are powered on and are working normally, the lamp A4 is powered on but is working abnormally. Thus, the icons of the lamps A1, A5, and A8 are marked with the gray color on the monitor interface 30, the icons of the lamps A2, A3, A6, and A7 are marked with the green color, and the icon of the lamp A4 is marked with the red color.

In other embodiments, the method may further include the following steps. If the data receiving module 241 does not receive any captured images from the lamp 4 when the lamp 4 is in the power-off condition, the state determining module 243 determines that the lamp 4 is in the normal state. If the data receiving module 241 receives captured images from the lamp 4 when the lamp 4 is in the power-off condition (e.g., the lamp 4 is powered on but the power control equipment 3 is damaged and records a wrong condition of the lamp 4), and the character values of the captured images are greater than the threshold value, the state determining module 243 determines that the power control equipment 3 is damaged.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for detecting a state of a lamp using an electronic device, the method comprising:

sampling a specified number of captured images of the lamp;

calculating a character value of each of the sampled images;

determining a state of the lamp according to the character value of each of the sampled images, the state of the lamp comprising a normal state and an abnormal state; and marking the lamp on a monitor interface of a display screen of the electronic device when the lamp is in the abnormal state.

2. The method according to claim 1, wherein the character value of each of the sampled images is obtained by calculating an average value of luminance values of pixels in each of the sampled images.

3. The method according to claim 1, wherein the character value of each of the sampled images is calculated by:

transforming each of the sampled images into a binary image, and calculating an average value of luminance values of pixels in the binary image; and determining the calculated average value as the character value of each of the sampled images.

4. The method according to claim 1, wherein the state of the lamp is determined by:

determines that the lamp is in the normal state upon a condition that the character value of each of the sampled images is greater than a threshold value when the lamp is powered on, or the character values of previous sampled images captured within a previous preset time period are less than the threshold value, and the character values of subsequent sampled images captured within a subsequent preset time period are greater than the threshold value;

determines that the lamp is in the abnormal state upon a condition that the character value of each of the sampled images is less than the threshold value when the lamp is powered on, or the character values of a first part of the sampled images are greater than the threshold value at a first time, and the character values of a second part of the sampled images are less than the threshold value at a second time.

5. The method according to claim 1, further comprising:

determining that the lamp is in the normal state upon a condition that the captured images are not received when the lamp is powered off; and determining that a power control equipment of the lamp is damaged upon a condition that the captured images are received when the lamp is powered off, and the character values of the captured images are greater than a threshold value.

6. The method according to claim 1, further comprising:
sending out alarm messages when the lamp is in the abnormal state.

7. An electronic device, comprising:
a processor;
a display screen;
a storage device storing a plurality of instructions, which when executed by the processor, causes the processor to:
sample a specified number of captured images of a lamp;
calculate a character value of each of the sampled images;
determine a state of the lamp according to the character value of each of the sampled images, the state of the lamp comprising a normal state and an abnormal state; and
mark the lamp on a monitor interface of the display screen when the lamp is in the abnormal state.

8. The electronic device according to claim 7, wherein the character value of each of the sampled images is obtained by calculating an average value of luminance values of pixels in each of the sampled images.

9. The electronic device according to claim 7, wherein the character value of each of the sampled images is calculated by:

transforming each of the sampled images into a binary image, and calculating an average value of luminance values of pixels in the binary image; and determining the calculated average value as the character value of each of the sampled images.

10. The electronic device according to claim 7, wherein the state of the lamp is determined by:

determines that the lamp is in the normal state upon a condition that the character value of each of the sampled images is greater than a threshold value when the lamp is powered on, or the character values of previous sampled images captured within a previous preset time period are less than the threshold value, and the character values of subsequent sampled images captured within a subsequent preset time period are greater than the threshold value;

determines that the lamp is in the abnormal state upon a condition that the character value of each of the sampled images is less than the threshold value when the lamp is powered on, or the character values of a first part of the sampled images are greater than the threshold value at a first time, and the character values of a second part of the sampled images are less than the threshold value at a second time.

11. The electronic device according to claim 7, wherein the method further comprises:

determining that the lamp is in the normal state upon a condition that the captured images are not received when the lamp is powered off; and determining that a power control equipment of the lamp is damaged upon a condition that the captured images are received when the lamp is powered off, and the character values of the captured images are greater than a threshold value.

12. The electronic device according to claim 7, wherein the method further comprises:

sending out alarm messages when the lamp is in the abnormal state.

13. A non-transitory storage medium having stored thereon instructions that, when executed by a processor of a electronic device, causes the electronic device to perform a method for detecting a state of a lamp using the electronic device, the method comprising:

sampling a specified number of captured images of the lamp;

calculating a character value of each of the sampled images;

determining a state of the lamp according to the character value of each of the sampled images, the state of the lamp comprising a normal state and an abnormal state; and marking the lamp on a monitor interface of a display screen of the electronic device when the lamp is in the abnormal state.

14. The non-transitory storage medium according to claim 13, wherein the character value of each of the sampled images is obtained by calculating an average value of luminance values of pixels in each of the sampled images.

15. The non-transitory storage medium according to claim 13, wherein the character value of each of the sampled images is calculated by:

transforming each of the sampled images into a binary image, and calculating an average value of luminance values of pixels in the binary image; and determining the calculated average value as the character value of each of the sampled images.

16. The non-transitory storage medium according to claim 13, wherein the state of the lamp is determined by:
  determines that the lamp is in the normal state upon a condition that the character value of each of the sampled images is greater than a threshold value when the lamp is powered on, or the character values of previous sampled images captured within a previous preset time period are less than the threshold value, and the character values of subsequent sampled images captured within a subsequent preset time period are greater than the threshold value;
  determines that the lamp is in the abnormal state upon a condition that the character value of each of the sampled images is less than the threshold value when the lamp is powered on, or the character values of a first part of the sampled images are greater than the threshold value at a first time, and the character values of a second part of the sampled images are less than the threshold value at a second time.

17. The non-transitory storage medium according to claim 13, wherein the method further comprises:
  determining that the lamp is in the normal state upon a condition that the captured images are not received when the lamp is powered off; and
  determining that a power control equipment of the lamp is damaged upon a condition that the captured images are received when the lamp is powered off, and the character values of the captured images are greater than a threshold value.

18. The non-transitory storage medium according to claim 13, wherein the method further comprises:
  sending out alarm messages when the lamp is in the abnormal state.

* * * * *